United States Patent Office 3,431,212
Patented Mar. 4, 1969

3,431,212
VINYLIC GRIGNARD REAGENT COMPOSITION
Richard D. Gorsich, Baton Rouge, La., assignor to Ethyl Corporation, New York, N.Y., a corporation of Virginia
No Drawing. Original application Nov. 2, 1964, Ser. No. 408,400. Divided and this application Jan. 31, 1968, Ser. No. 701,865
U.S. Cl. 252—182
Int. Cl. C09k 3/00; C07f 7/24
5 Claims

ABSTRACT OF THE DISCLOSURE

A liquid composition comprising a vinylic Grignard reagent, about 1 mole of hydrocarbon halide per 3 moles of said vinylic Grignard reagent and at least 1 mole of a cyclic monoether.

CROSS-REFERENCE TO RELATED APPLICATIONS

This application is a division of application Ser. No. 408,400 filed Nov. 2, 1964, now pending.

BACKGROUND OF THE INVENTION

The preparation of vinyl lead compounds has been disclosed in U.S. Patent 3,071,607, patened Jan. 1, 1963, and in U.S. Patent 3,148,959, patented Sept. 15, 1964. According to these patents the vinyl lead compounds may be produced by reacting a vinyl Grignard reagent with the lead chloride. However, such a process has certain disadvantages such as the relatively low yields obtained. Furthermore, the process produces free lead and the free lead produced will not react with additional quantities of vinyl Grignard reagent and thus it must be recovered, purified, and if reused, converted to lead chloride. It is accordingly an object of this invention to provide an improved process for the production of tetravalent lead compounds having vinylic radicals attached to the lead. It is a further object of this invention to directly produce an organolead composition suitable for improved antiknock compositions. Another object is to produce organo lead compounds having both alkyl and vinylic groups attached to the lead at higher yields and efficiencies. An additional object of this invention is to produce alkyltrivinylic lead compounds in high yields and further to produce a mixture of alkyltrivinylic lead and tetrayinvlic lead compounds. Still another object of this invention is to provide a liquid composition suitable for reacting with a lead salt to prepare the desired tetravalent lead compounds having vinylic groups attached to the lead. These and other objects will be apparent in the description which follows.

According to this invention tetravalent lead compounds having vinylic groups attached to the lead may be produced at high yields by combining in a first step a vinylic Grignard reagent with an organic halide and in a second step reacting the product with a lead salt. Preferably both of the reactions will be conducted in the presence of a cyclic ether.

It has recently been discovered that vinylic lead compounds may be produced by the reaction of a vinylic Grignard reagent with a lead halide and an alkyl halide. That reaction broadly is being claimed in a copending application filed on even date. However, according to the present invention it has been surprisingly found that if in a first step a product of the vinylic Grignard reagent and e.g. an alkyl halide much higher yields of vinylic lead compounds are produced. Furthermore, the vinylic lead compounds produced contain a high ratio of vinylic to alkyl groups. The desirable alkyltrivinylic lead compounds are selectively produced in very high yields. These products are useful as antiknock compounds for gasoline.

The process and composition of this invention may be more completely understood and illustrated by the following examples. All parts are by weight unless expressed otherwise.

Example I

Vinyl magnesium chloride was prepared by the reaction of magnesium and vinyl chloride at 55–60° C. Magnesium chips, 25 g., were reacted in tetrahydrofuran with an excess of vinyl chloride. The reaction was initiated with 0.5 ml. of ethylene dibromide. The reaction product was cooled and unreacted vinyl chloride was distilled off. The product solution was filtered to remove a small amount of unreacted magnesium. Aliquots of this product solution indicated it was 1.89 molar, as evidenced by the usual acid titration method for Grignards.

A dry, 500-ml., 4-necked flask was charged with 107 ml. (200 mmoles) of vinyl magnesium chloride and 50 ml. of tetrahydrofuran (distilled from $NaAlH_4$) in an inert atmosphere. The reaction vessel was then fitted with a high speed stirrer, a thermometer, and a Dry Ice-isopropanol condenser. The system was assembled under a nitrogen atmosphere and a slight positive nitrogen pressure was maintained throughout the course of the reaction. After charging the condenser with Dry Ice-isopropanol, 7.8 g. of refrigerant grade methyl chloride was condensed into the reaction mixture while stirring and while cooling the mixture at 5° C.

A dry, 50 ml. flask was charged with 13.9 g. (50 mmols) of lead chloride in an inert atmosphere. The vessel containing the lead chloride was connected with rubber tubing to the 500 ml. flask containing the vinyl magnesium chloride-methyl chloride-tetrahydrofuran product. Subsequently, the $PbCl_2$ was added to the 500 ml. flask in small portions during a period of 14 minutes while rapidly stirring. The reaction temperature was maintained at +3 to +5 C. during the addition by external cooling. The $PbCl_2$ addition flask was rinsed with 20 ml. of tetrahydrofuran. After the addition was complete, the reaction mixture was stirred at 5° for 15 min. and at 25° C. for 15 min. The reaction mixture was then cooled to 10° C. and was slowly hydrolyzed with 10.5 g. of ammonium chloride in 75 ml. of water. The product was steam distilled. The distillate was diluted with water until the organic layer settled to the bottom. The water was decanted and extracted with hexane which was separated and combined with the organic layer. A small amount of water was separated. Analysis of the organic layer by the dithizone method for organic lead showed the solution to contain 10.36 g. (100 percent yield based on $PbCl_2$) of Pb as $R_4Pb$. Analysis of the product by vapor phase chromatography showed it to consist of 98.9 wt. percent trivinylmethyl lead and 1.1 wt. percent dimethyldivinyl lead.

Example II

Lead chloride, 13.9 g. was added as described in Example I to 78 ml. of a tetrahydrofuran solution containing 150 mmols of vinyl magnesium chloride, 50 ml. of tetrahydrofuran and 7.8 g. of methyl chloride during 21 minutes at 25° C. The Grignard concentration was determined by hydrolysis of the Grignard and measurement of the ethylene evolved. The mixture was stirred at 25° C. for 15 minutes and then was worked up as described in Example I. The yield of trivinylmethyl lead was 92.5%. The product consisted of 97.6 wt. percent trivinylmethyl lead and 2.4 wt. percent divinylmethyl lead.

Example III

Lead chloride, 9.8 g., was added to a stirred solution consisting of 63 ml. of 1.83 N vinyl magnesium chloride in tetrahydrofuran, 7.6 g. of methyl chloride and 50 ml. of diethyl ether at 5° C. during 10 minutes. The lead chloride addition flask was rinsed with 20 ml. of diethylether. The mixture was stirred at 5° C. for 15 minutes and at 25° C. for 15 minutes. Work-up of the mixture by steam distillation gave a tetraorgano lead composition consisting of 98.8% trivinylmethyl lead and 1.2 wt. percent divinyldimethyl lead. When the lead chloride addition was made at 25° C. the product consisted of 90.7% trivinylmethyl lead and 9.3% divinyldimethyl lead.

Example IV

Lead chloride, 11.1 g., was added to 122 ml. of tetrahydrofuran containing 120 mmols of vinyl magnesium chloride and 7.3 g. of ethyl chloride at 25° C. during a period of 10 minutes. The mixture was heated to 50° C. to complete the reaction. Work-up as described in previous examples afforded ethylvinyl lead compounds.

Example V

Vinyl magnesium chloride, 130 mmols, in 140 ml. of tetrahydrofuran is combined with 60 mmols of n-butyl chloride with stirring. Thereafter 40 mmols of lead dichloride is added to the reaction flask while maintaining the reaction temperature at 25° C. A high yield of tetraorgano lead compounds having both n-butyl and vinyl groups attached to the lead is obtained.

Example VI

Vinyl magnesium bromide, 90 mmols, in 50 ml. of tetrahydrofuran and 50 ml. of dioxane is combined with 30 mmols of n-propyl chloride. Thereafter 30 mmols of lead dichloride is added to the reaction flask over a period of 60 minutes while maintaining the reaction temperature at 0° C.

Example VII 1-propenyl magnesium chloride, 160 mmols, in 150 ml. of tetrahydropyran is combined with 90 mmols of methyl chloride at about 25° C. In a second step 50 mmols of lead dibromide is added to the reaction flask over a period time of 30 minutes while maintaining the reaction flask at a temperature of 60° C. The product is a combination of tetraorgano lead compounds containing a high ratio of methyltri-1-propenyl lead.

Example VIII 2-methyl-1-butenyl magnesium chloride, 140 mmols, in a solvent mixture of 50 ml. of benzene and 100 ml. of tetrahydrofuran is combined with 35 mmols ethyl iodide, and the combination reacted with 25 mmols of lead acetate. A good yield of tetraorgano lead compounds is produced.

Example IX

Vinyl magnesium chloride, 70 mmols, in a solvent comprising 25 ml. of the dimethyl ether of diethylene glycol, 25 ml. of methylal and 75 ml. of tetrahydrofuran is combined with 30 mmols of methyl chloride at about 25° C. During a period of about 25 minutes, 30 mmols of lead naphthenate is added to the reaction mixture while maintaining the reaction mixture at a temperature of 5° C.

The vinylic lead compositions produced according to the present process comprise, in general, organo lead compounds having vinylic groups attached directly to lead and any remaining valences of the lead are satisfied by hydrocarbon radicals, preferably alkyl. Generally, the hydrocarbon radicals will contain from 1 to 12 carbon atoms, with the hydrocarbon radicals having one or 8 carbon atoms being particularly preferred. Especially preferred are the alkyl radicals of one or 2 carbon atoms. The hydrocarbon groups may be the same or different. The vinylic groups may also be the same or different. Examples of compounds that may be produced according to this invention are trimethylvinyl lead, dimethyldivinyl lead, methyltrivinyl lead, triethylvinyl lead, diethyldivinyl lead, ethyltrivinyl lead, methylethyldivinyl lead, methyldiethylvinyl lead, n-butyltrivinyl lead, n-hexyltrivinyl lead, 2-ethylhexyltrivinyl lead, dimethylethylvinyl lead, dimethyldipropenyl lead, dimethyldibutenyl lead, methyltriisobutenyl lead, isopropyltrivinyl lead, methyldivinylpropenyl lead, mixtures thereof and the like. However, as shown above the reaction is selective for the production of alkyltrivinylic lead compounds.

Preferred organo lead compositions are those containing as the major product alkyltrivinyl lead, such as methyltrivinyl lead. Another preferred composition is that wherein the product contains as the major component a mixture of alkyltrivinylic lead compounds and dialkyldivinylic lead, such as a product containing at least 50 mole percent of a combination of alkyltrivinylic lead and dialkyldivinylic lead with this combination more preferably being at least about 75 mole percent of the organo lead product. These compositions possess unique characteristics such as for antiknock compositions, and it is an important feature of this invention that these compositions may be produced directly.

The reaction should preferably be conducted in the presence of a cyclic ether. Apparently the cyclic ether functions not only as a solvent but also as a catalyst, particularly in regard to the reaction of the organo halide such as the alkyl halide with the other components. Another function of the cyclic ether is to influence the distribution of the products. The cyclic ether further appears to interact with the other reactants to increase the yield of vinylic lead compounds and to reduce the formation of by-product lead.

Suitable cyclic ethers are mono ethers such as those having the formula

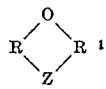

wherein R is an unsubstituted alkylene radical, R' is selected from the group consisting of an ethylene radical, an ethylenically unsaturated divalent hydrocarbon radical, >CHA and mixtures thereof; Z is selected from the group consisting of a methylene radical, >NA and mixtures thereof, and A is an aliphatic radical of from 1 to 10 carbon atoms. When Z is >NR, the ring will contain 6 members and Z and O will be 1, 4 with respect to each other. The cyclic ethers will suitably contain up to 20 carbon atoms. Suitably there will be at least one hydrogen atom attached to each carbon atom in the ring. The cyclic ether may be substituted with radicals which will not react with the vinylic Grignard reagent, the lead salt or the hydrocarbon halide. Suitable substituents are alkyl radicals such as ethyl, aryl radicals such as phenyl, alkoxy radicals such as methoxy, and aroxy radicals such as toloxy. The number of carbon atoms in the substituted radicals will be from one to 12, preferably from one to 8. Preferably the cyclic ethers will have from 5 to 6 atoms in the ring structure. Suitable cyclic ethers are tetrahydrofuran, 3-ethyl tetrahydrofuran, 2-(o-toloxy) tetrahydrofuran, N-methyl morpholine, the methyl ether of tetrahydrofurfuryl alcohol, 3 - phenoxy - tetrahydrofuran, 4-ethoxytetrahydrofuran, 2,5-dihydrofuran, tetrahydropyran, 4-methoxytetrahydropyran, 2 - ethoxy - 3,4 - dihydro-2H·pyran, mixtures thereof and the like.

The preferred cyclic ethers are tetrahydrofuran and tetrahydropyran with tetrahydrofuran being especially preferred. The oxygen of the cyclic ether must be free to form a complex with the vinylic Grignard reagent, consequently, the cyclic ethers employed should not have groups in the ring which would block the formation of a complex between the ring oxygen and the vinylic Grignard reagent.

The described cyclic ether should preferably be present in an amount of at least one mole of cyclic ether per mole of vinylic Grignard reagent during both the first and second steps of the process. Better results are generally obtained when the cyclic ether is present in an amount of greater than one mole per mol of vinylic Grignard reagent. The upper limit of cyclic ether is not particularly critical but for economic reasons will not ordinarily exceed about 5 moles of cyclic ether per mole of vinylic Grignard reagent. The desired ratio will be dependent somewhat on the amount of lead halide and alkyl halide present. A suitable range is from .5 to 4 moles of cyclic ether per mole of vinylic Grignard. The cyclic ether will, for best results, constitute at least 50 mole percent of the solvent and diluent present during the reaction to form the vinylic lead compounds.

The lead salts are preferably lead halides such as lead dichloride, although less desirably lead dibromide and lead diiodide may be employed or even lead dihalides having different halogen atoms attached to the lead. Lead tetrachloride may be employed but generally will be converted to the dichloride during the reaction. Other lead salts are lead acetate and lead naphthenate. Suitable lead salts are those that are known to react with Grignard reagents, such as alkyl Grignard reagents. Also mixtures of lead salts may be employed.

By the term vinylic Grignard reagent (i.e. a vinylic magnesium halide) is meant 1-alkenyl compounds of the formula RR'C=CHMgX wherein R and R' are the same or different hydrocarbon radicals, hydrocarbonoxy radicals or hydrogen, such as those selected from the group consisting of hydrogen, alkyl, alkoxy, aryl, aralkyl, alkaryl, araoxy and mixtures thereof. The aryl radicals suitably contain a single benzene ring with the radicals being such as the phenoxy radical, phenyl radical and the mono, di and tri aliphatic substituted phenyl or phenoxy radicals. The vinylic Grignard reagents will have from 2 to 20 carbon atoms. Examples of vinylic Grignard reagents are vinyl magnesium chloride, propenyl magnesium chloride, hexenyl magnesium chloride, 2-ethyl hexenyl magnesium chloride, vinyl magnesium bromide, 2-phenyl ethenyl magnesium chloride, 2-phenoxy ethenyl magnesium chloride, 2-tolyl ethenyl magnesium chloride, cyclohexene-1-yl-1 magnesium chloride, mixtures thereof and the like.

The vinylic Grignard agent of the formula

$$R_2C=CHMgX$$

may be produced in conventional manner. The halogen of the Grignard reagent and generally the halogen of the hydrocarbon halide will have an atomic weight of at least 35, that is, the halogen will be selected from the group consisting of chlorine, bromine, iodine and mixtures thereof. Chlorine is particularly preferred because of the excellent results and overall economy.

The hydrocarbon halide will be a compound of the formula RX wherein X is a halogen, preferably chlorine. Again less desirably, bromine and iodine may be used. The hydrocarbon radical may be normal or iso and will suitably have from 1 to 12 carbon atoms. Alkyl halides are preferred but cycloaliphatic halides may be employed. Generally the vinyl halides should be avoided. Alkyl radicals may be, for example, methyl, ethyl, propyl, isopropyl, n-butyl, isobutyl, 2-ethyl hexyl and the like. Examples of hydrocarbon halides are methyl chloride, methyl iodide, methyl bromide, ethyl chloride, n-propyl chloride, n-butyl chloride, isobutyl bromide, n-amyl chloride, n-octyl chloride, cyclohexyl chloride mixtures thereof and the like. Preferred alkyl halides are methyl chloride and ethyl chloride. Various combinations of the hydrocarbon halides may be used. For example, two or more hydrocarbon halides can be used simultaneously in a one-stage process or different hydrocarbon halides may be used in each stage of a two-stage process. Therefore, one method for producing mixed lead compounds wherein the hydrocarbon groups are different is to utilize a combination of hydrocarbon halides, such as combination of methyl chloride and ethyl chloride. The combined methyl chloride and ethyl chloride may then be reacted with the vinylic Grignard reagent and the lead halide. The mixture of hydrocarbon halides may be present in any combination, and more than two hydrocarbon halides may also be employed.

The ratio of the total hydrocarbon halide to the total lead salt may be varied somewhat but generally will be in the ratio of about 0.5 to 10 moles of hydrocarbon halide per mole of lead salt. A preferred ratio of hydrocarbon halide to lead salt is between 1 and 4 moles of hydrocarbon halide per mole of lead salt. The ratio of the moles of vinylic Grignard reagent per mole of lead halide will normally be within the range of 2 to 10 but preferably will be present from 3 to 5 moles of vinylic Grignard reagent per mole of lead salt. The best overall results have been obtained at a ratio of about 3 moles of vinylic Grignard reagent and about one mole of hydrocarbon halide per mole of lead salt.

In the first step of the process the vinylic Grignard reagent is combined with the hydrocarbon halide. The exact mechanism of the overall reaction is not understood but, according to this invention, the vinylic Grignard reagent and the hydrocarbon halide must be combined prior to the reaction with the lead salt. The vinylic Grignard reagent and the hydrocarbon halide may be added together, at once or gradually mixed. Thereafter the lead salt may be added at one time or in increments.

The reactor employed may be of conventional design. Commercial reactors used for the preparation of tetraalkyllead by the reaction of sodium-lead alloys with an alkyl halide are satisfactory. The reactor should, of course, be suitable for operating under the pressure generated by the particular reactants at the temperature of reaction.

The temperature of reaction of either the first or second step of the reaction is not critical. It should be sufficiently high to give reasonable reaction rates but should not be above the decomposition temperature of the organometallic reactants or the organolead products. Thus, the operating temperature of the reaction depends upon the particular organo-metallic compounds involved. In general, suitable temperatures are between about −20 C. and about 150° C., but temperatures from about 0 to 50° C. are preferred to facilitate heat removal and for best results. Higher temperatures can be employed when using organo lead thermal stabilizers. In some instances considerable exothermic heat is generated and consequently a cooling medium may be desired to control the temperature.

About atmospheric pressure is normally employed for both reactions, although subatmospheric pressures are permissible. In some instances, supraatmospheric pressure is preferred, particularly when employing a relatively high temperature and a relatively volatile solvent. Also, a pressure of inert gas such as nitrogen is sometimes desirable, for example, to assure anhydrous conditions. The pressure will generally be from about one to 10 atmospheres with the range of about atmospheric (STP) to 75 p.s.i.g. being generally suitable.

The products of this invention possess considerable utility. These compostions are soluble in hydrocarbons and are valuable as antiknock compositions for gasolines. The compositions containing the distributed isomers are of particular value. As has been shown this composition may be produced directly by the process of this invention.

Other embodiments of this invention can be made without departing from the spirit and scope of this invention which is not limited to the specific embodiments given herein.

I claim:
1. A liquid composition comprising a reactant compound, about 1 mole of hydrocarbon halide per 3 moles of said reactant compound and at least 1 mole of cyclic mono ether, said reactant compound being at least one represented by the formula RR'C=CHMgX, wherein R and R' each are at least one monovalent radical selected from the group consisting of alkyl, alkoxy, aryl, aralkyl, alkaryl, aroxy and hydrogen and X is a halogen selected from the group consisting of chlorine, bromine and io- dine; said hydrocarbon halide being at least one compound represented by the formula R"X', wherein R" is at least one hydrocarbon radical selected from the group consisting of an alkyl radical having from 1 to 12 carbon atoms and cycloaliphatic radicals and X' is a halogen selected from the group consisting of chlorine, bromine and iodine; and said cyclic mono ether being at least one ether represented by the formula

wherein $R_1$ is an alkylene radical, $R_2$ is selected from the group consisting of an ethylene radical, an ethylenically unsaturated divalent hydrocarbon radical, >CHA; Z is selected from the group consisting of a methylene radical and >NA and A is an aliphatic radical.

2. The liquid composition of claim 1 further characterized by said reactant compound being a mixture of reactant compounds as defined.

3. The liquid composition of claim 1 further characterized by said hydrocarbon halide being a mixture of hydrocarbon halides as defined.

4. The liquid composition of claim 1 further characterized by said cyclic mono ether being a mixture of cyclic mono ethers as defined.

5. The liquid composition of claim 1 further characterized by said cyclic mono ether being tetrahydrofuran.

References Cited
UNITED STATES PATENTS

| | | | |
|---|---|---|---|
| 2,838,508 | 6/1958 | Ramsdan | 260—665 X |
| 3,156,716 | 11/1964 | Ramsdan et al. | 260—437 |

LEON D. ROSDOL, *Primary Examiner.*

I. GLUCK, *Assistant Examiner.*

U.S. Cl. X.R.

260—437, 665; 252—386